United States Patent
Kolodziej (10) Patent No.: US 7,526,346 B2
(45) Date of Patent: Apr. 28, 2009

(54) NONLINEAR THERMAL CONTROL OF A PEM FUEL CELL STACK

(75) Inventor: Jason R. Kolodziej, West Henrietta, NY (US)

(73) Assignee: General Motors Corporation, Detroit, MI (US)

( * ) Notice: Subject to any disclaimer, the term of this patent is extended or adjusted under 35 U.S.C. 154(b) by 513 days.

(21) Appl. No.: 11/009,526

(22) Filed: Dec. 10, 2004

(65) Prior Publication Data

US 2006/0125441 A1 Jun. 15, 2006

(51) Int. Cl.
*G05B 13/02* (2006.01)

(52) U.S. Cl. .......................... 700/45; 320/101; 320/150; 429/12; 429/13; 429/20; 700/38; 700/44; 700/299; 903/908; 903/944

(58) Field of Classification Search ................. 700/299, 700/38, 44, 45; 429/20–26, 12–13, 19; 320/101, 320/150; 903/908, 944
See application file for complete search history.

(56) References Cited

U.S. PATENT DOCUMENTS

| | | | | |
|---|---|---|---|---|
| 5,290,641 A | * | 3/1994 | Harashima | 429/17 |
| 5,991,670 A | * | 11/1999 | Mufford et al. | 701/22 |
| 6,651,761 B1 | * | 11/2003 | Hrovat et al. | 180/65.3 |
| 6,887,606 B2 | * | 5/2005 | Parr et al. | 429/22 |
| 7,087,335 B2 | * | 8/2006 | Kolodziej et al. | 429/25 |
| 2004/0115491 A1 | * | 6/2004 | Cargnelli et al. | 429/13 |

* cited by examiner

*Primary Examiner*—Paul L Rodriguez
*Assistant Examiner*—Carlos Ortiz Rodriguez (57) ABSTRACT

A temperature control scheme for a fuel cell stack thermal sub-system in a fuel cell system that uses a non-linear thermal model and disturbance rejection to provide an optimum stack temperature. The thermal sub-system includes a coolant loop directing a cooling fluid through the stack, a pump for pumping the cooling fluid through the coolant loop, and a radiator for cooling the cooling fluid outside of the fuel cell stack. The system includes a controller for controlling the speed of the pump so as to maintain the temperature of the stack at a desired temperature. The controller uses the thermal model to anticipate a temperature of the cooling fluid out of the fuel cell stack to control the speed of the pump.

20 Claims, 6 Drawing Sheets

NONLINEAR THERMAL CONTROL OF A PEM FUEL CELL STACK

BACKGROUND OF THE INVENTION

1. Field of the Invention

This invention relates generally to a technique for controlling the temperature of a fuel cell stack in a fuel cell system and, more particularly, to a technique for controlling the temperature of a fuel cell stack in a fuel cell system by using a lumped parameter non-linear thermal model of the stack to anticipate the temperature of the cooling fluid out of the stack and controlling a pump in response thereto.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the MEA. Cathode gas flow channels are provided on the cathode side of the bipolar plates that allow the cathode gas to flow to the MEA. The bipolar plates are made of a conductive material, such as stainless steel, so that they conduct the electricity generated by the fuel cells out of the stack. The bipolar plates also include flow channels through which a cooling fluid flows.

It is necessary that a fuel cell operate at an optimum relative humidity and temperature to provide efficient stack operation and durability. The temperature provides the relative humidity within the fuel cells in the stack for a particular stack pressure. Excessive stack temperature above the optimum temperature may damage fuel cell components, reducing the lifetime of the fuel cells. Also, stack temperatures below the optimum temperature reduces the stack performance.

Figure 1:
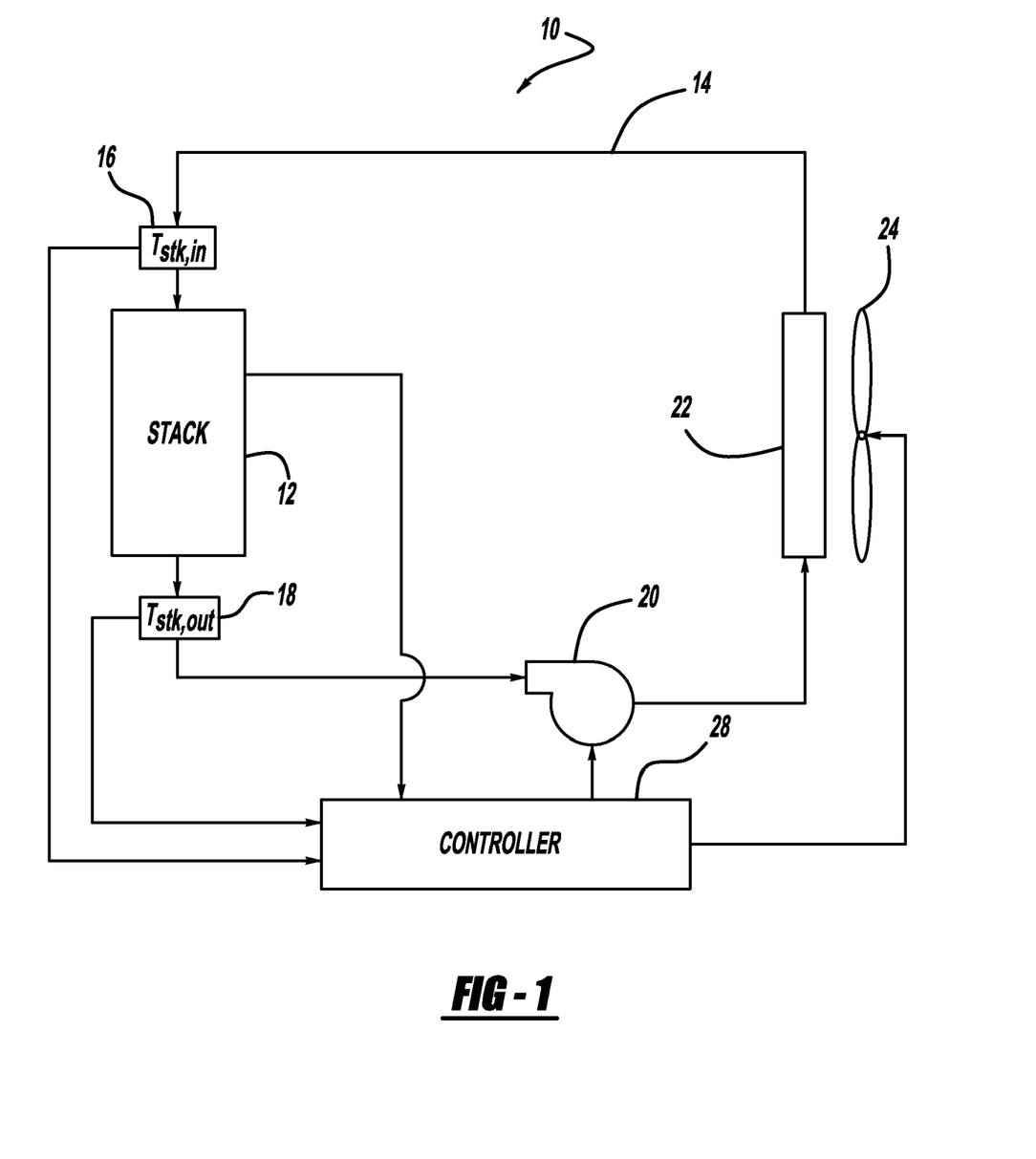
FIG. 1 is a schematic plan view of a thermal sub-system for a fuel cell stack in a fuel cell system.

Fuel cell systems employ thermal sub-systems that control the temperature within the fuel cell stack. Particularly, a cooling fluid is pumped through the cooling channels in the bipolar plates in the stack. FIG. 1 is a schematic plan view of a fuel cell system 10 including a thermal sub-system for providing cooling fluid to a fuel cell stack 12. The cooling fluid that flows through the stack 12 flows through a coolant loop 14 outside of the stack 12 where it either provides heat to the stack 12 during start-up or removes heat from the stack 12 during fuel cell operation to maintain the stack 12 at a desirable operating temperature, such as 60° C.-80° C. An input temperature sensor 16 measures the temperature of the cooling fluid in the loop 14 as it enters the stack 12 and an output temperature sensor 18 measures the temperature of the cooling fluid in the loop 14 as it exits the stack 12.

A pump 20 pumps the cooling fluid through the coolant loop 14, and a radiator 22 cools the cooling fluid in the loop 14 outside of the stack 12. A fan 24 forces ambient air through the radiator 22 to cool the cooling fluid as it travels through the radiator 22. A controller 28 controls the speed of the pump 20 and the speed of the fan 24 depending on the temperature signals from the temperature sensors 16 and 18, the power output of the stack 12 and other factors.

Because the membranes in the fuel cell stack 12 are very sensitive to damage and require a strict relative humidity control for efficient stack operation, it is important to precisely control the internal temperature of the fuel cell stack 12. The current temperature control systems monitor the output temperature of the stack 12, and as the temperature of the cooling fluid from the stack 12 changes, the controller 28 increases or decreases the speed of the pump 20 and the speed of the fan 24 to provide more or less cooling. However, if the temperature of the stack 12 has already increased or decreased before the pump 20 responds, the relative humidity of the membranes has changed. It would be desirable to anticipate an increase or decrease in the temperature of the stack 12, and change the flow rate of the cooling fluid before the temperature of the stack 12 significantly changes.

SUMMARY OF THE INVENTION

In accordance with the teachings of the present invention, a temperature control scheme for a fuel cell stack thermal sub-system in a fuel cell system is disclosed that uses a non-linear thermal model and disturbance rejection to provide an optimum stack temperature. The thermal sub-system includes a coolant loop directing a cooling fluid through the stack, a pump for pumping the cooling fluid through the coolant loop, and a radiator for cooling the cooling fluid outside of the fuel cell stack.

In one embodiment, the system includes a controller for controlling the speed of the pump so as to maintain the temperature of the stack at the optimum temperature. The controller generates an error signal that is the difference between a desired stack temperature and a temperature of the cooling fluid out of the fuel cell stack. The controller applies feedback control to the error signal to generate a control signal and modifies a disturbance signal to generate a modified disturbance signal. The controller adds the feedback control signal to the modified disturbance signal to generate a disturbance control signal. The controller generates a mass flow rate signal using the disturbance control signal, and linearizes the thermal model using the mass flow rate signal to reject the disturbance in the modified disturbance signal. The controller uses the mass flow rate signal to set the speed of the pump.

DETAILED DESCRIPTION OF THE EMBODIMENTS

The following discussion of the embodiments of the invention directed to a technique for controlling the temperature of a fuel cell stack is merely exemplary in nature, and is in no way intended to limit the invention or its applications or uses.

The present invention proposes using a lumped parameter non-linear thermal model of the fuel cell stack 12 for anticipating the temperature $T_{stk,out}$ of the cooling fluid out of the stack 12 and controlling the pump 20 in response thereto so as to maintain the temperature $T_{stk,out}$ of the cooling fluid out of the stack substantially constant, and thus, prevent damage to the stack components and maintain the relative humidity of the stack membranes at a substantially optimum level. The thermal model is closely related to a continuous stirred-tank reactor (CSTR), which results in a non-linear, first-order differential equation. The model formulation provides an energy balance according to the following equation.

$$\dot{E}_{stored} = \dot{E}_{in} - \dot{E}_{out} + \dot{E}_{gen} \quad (1)$$

Where, $$\dot{E}_{in} = \dot{m}_{in}\left(u + P\upsilon + \frac{V^2}{2} + gZ\right)_{in} + \dot{q}_{in}$$

$$\dot{E}_{out} = \dot{m}_{out}\left(u + P\upsilon + \frac{V^2}{2} + gZ\right)_{out} + \dot{\omega}_{out}$$

$$\dot{E}_{gen} = StackPower \text{ in watts}$$

$$\dot{E}_{stored} = \frac{d}{dt}(\rho VolC_pT_{stk,out})$$

And where, $\dot{m}$ is the cooling fluid mass flow rate into and out of the fuel cell stack 12, $\rho$ is the density of the cooling fluid, $C_p$ is the specific heat of the cooling fluid, Vol is the effective volume of the cooling fluid in the stack 12, u is the internal energy of the stack 12, P is pressure, $\upsilon$ is specific volume, $V^2/2$ is the kinetic energy, gZ is the potential energy, $\dot{q}_{in}$ represents heat transferred to the fuel cell stack 12, and $\omega_{out}$ is the work done by the fuel cell stack 12.

The stack power $\dot{E}_{gen}$ is the energy generated within the fuel cell stack 12. It is assumed that under perfect conditions, one fuel cell in the stack 12 will produce about 1.23 volts. It is also assumed that whatever energy does not go into generating the 1.23 volts per cell goes into generating heat that is transferred to the cooling fluid within the stack 12. It is further assumed that the CSTR model provides perfect mixing of the cooling fluid within the fuel cell stack 12. Therefore, the stack temperature is equal to the temperature $T_{stk,out}$ of the cooling fluid coming out of the stack 12.

Assuming that the velocity V and the height Z into and out of the fuel cell stack 12 are equal, there is no work done when $\omega_{out}=0$, and there is no heat transferred to the fuel cell stack 12. Equation (1) then reduces to:

$$\frac{d}{dt}(\rho VolC_pT_{stk,out}) = \dot{m}_{in}(u+P\upsilon)_{in} - \dot{m}_{out}(u+P\upsilon)_{out} + \dot{E}_{gen} \quad (2)$$

The cooling fluid mass flow $\dot{m}$ into and out of the stack 12 must remain constant, i.e., $\dot{m}_{in}=\dot{m}_{out}=\dot{m}$. It is know that the sum of the internal energy and flow work is equal to enthalpy, i.e., $i=u+P\upsilon$. Assuming a constant specific heat (no temperature dependence), enthalpy is equal to $i=C_p*T$. Further, the quantity ($\rho VolC_p$) does not change over time, and is therefore constant. With these assumptions, equation (2) further reduces to equation (3) below, which represents a first-order, non-linear thermal model of the fuel cell stack 12.

$$(\rho VolC_p)\frac{d}{dt}T_{stk,out} = \dot{m}C_p(T_{stk,in} - T_{stk,out}) + \dot{E}_{gen} \quad (3)$$

It is clear from equation (3) that all of the parameters are known constants or measured quantities. However, because of the CSTR simplification, the thermal mass of the stack 12 is omitted. This results in the response time of the model being too fast. Even though the actual volume of the cooling fluid within the stack 12 is easily obtained, an effective volume $Vol_{eff}$ must be experimentally determined to correct for the response time of the thermal model. Using the effective volume $Vol_{eff}$ of the cooling fluid within the stack 12 for the model is more accurate than using the actual volume of the cooling fluid within the stack 12 for the model because the metal of the bipolar plates within the stack 12 retain heat, which acts to reduce the time it takes the cooling fluid to cool down.

Because the thermal model is non-linear and only one parameter, the effective volume $Vol_{eff}$, needs to be found, the easiest technique for determining the effective volume $Vol_{eff}$ is a parameter sweep of the cooling fluid volume subject to a cost function (J) based on minimizing the sum squared error.

$$\min J = (T_{stk,out} - \hat{T}_{stk,out})^T(T_{stk,out} - \hat{T}_{stk,out}) \quad (4)$$

In one example, the fuel cell stack 12 is a seventeen (17) cell stack having a 300 cm² active area stack. Open loop data is collected by varying the stack power $\dot{E}_{gen}$, the measured temperature $T_{stk,in}$ of the cooling fluid into the stack 12, the cooling fluid mass flow rate $\dot{m}$ and the measured temperature $T_{stk,out}$ of the cooling fluid out of the stack 12. As discussed above, the stack power $\dot{E}_{gen}$ is not simply the power drawn from the fuel cell stack 12, but rather is the energy loss due to the efficiency of the fuel cell stack 12, which results in heat transferred to the cooling fluid. Equation (5) below represents the heat transferred to the cooling fluid.

$$\dot{E}_{gen} = VI = (1.23 - V_{ave})*17*I \quad (5)$$

Where, 1.23 is the known maximum single cell voltage in a PEM fuel cell, $V_{ave}$ is the measured average cell voltage of the entire stack 12, and I is the current draw on the fuel cell stack 12. Equation (5) becomes the measured value for the energy transferred to the cooling fluid and is later treated as a known disturbance to the system.

Figure 2A:
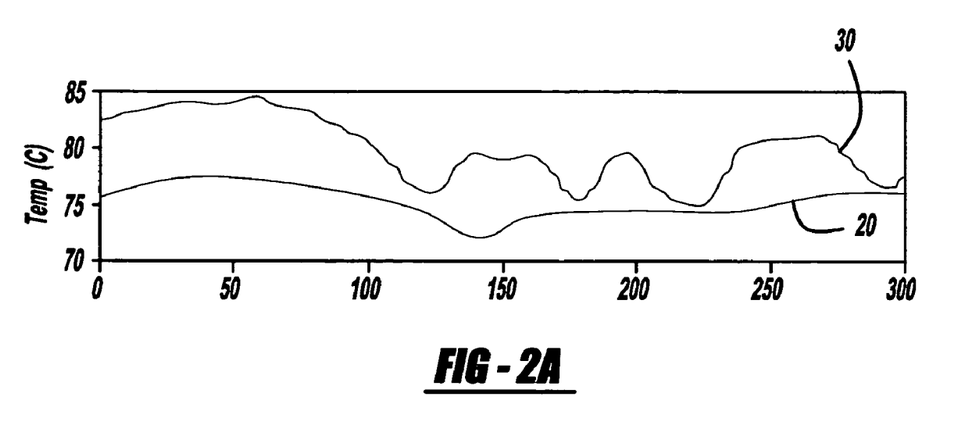
FIGS. 2(A)-2(C) are graphs with time on the horizontal axis and temperature, flow and power, respectively, on the vertical axis showing experimental data for an effective volume identification.
Figure 2B:
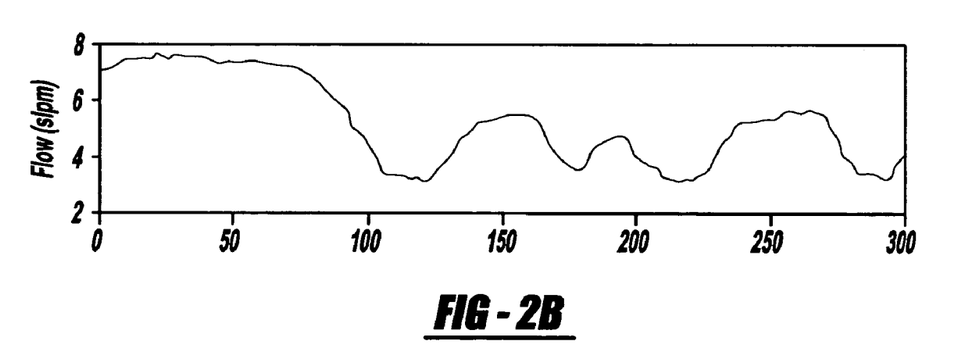
Figure 2C:
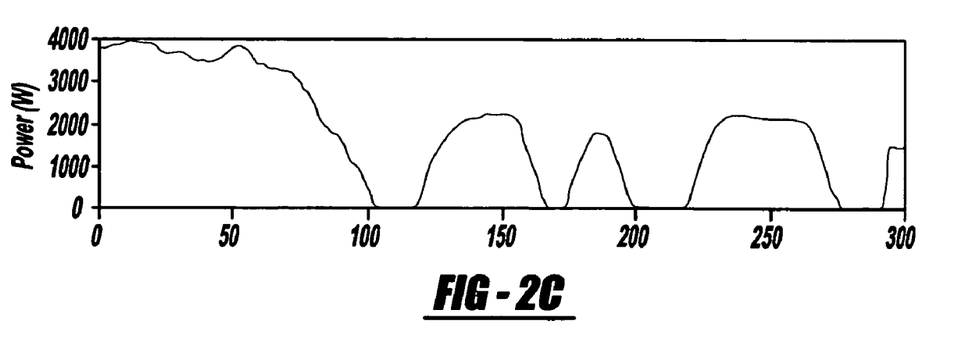

FIGS. 2(A)-2(C) are graphs with time on the horizontal axis and the temperature $T_{stk,in}$ of the cooling fluid into the stack (graph line 26) and the temperature $T_{stk,out}$ of the cooling fluid out of the stack (graph line 30), the cooling fluid mass flow rate $\dot{m}$ and the stack power $\dot{E}_{gen}$ on the vertical axis, respectively, showing experimental data for determining the effective volume $Vol_{eff}$ of the cooling fluid within the stack 12. Due to the one dimensional optimization, all that is required is to compare the thermal model in equation (3) with the various effective volumes and the measured data, and select a volume with the minimum cost function J from equation (4).

Figure 3:
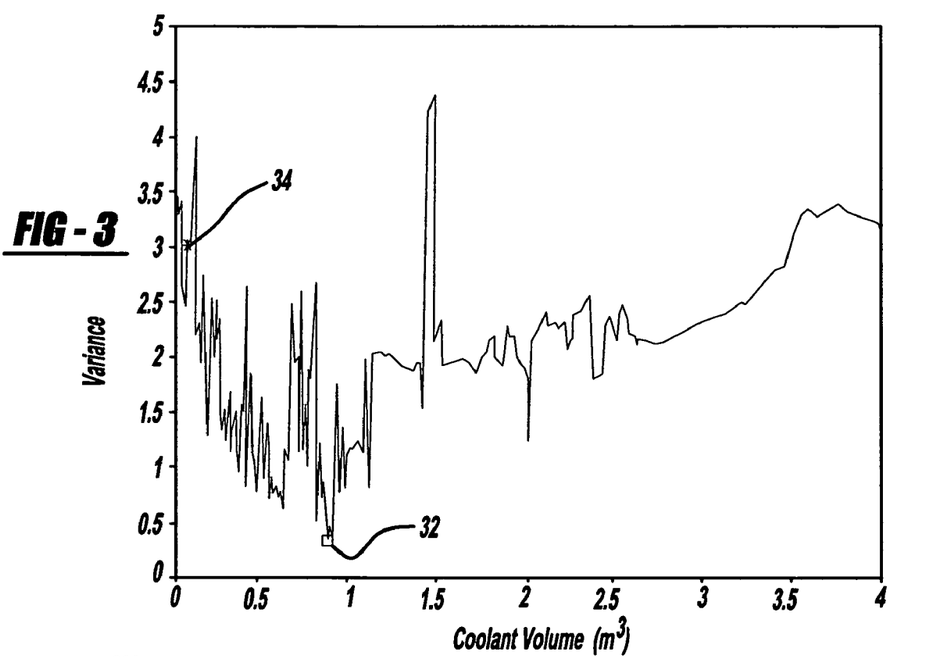
FIG. 3 is a graph with coolant volume on the horizontal axis and variance on the vertical axis showing an effective volume parameter sweep for a fuel cell stack.

FIG. 3 is a graph with cooling fluid volume on the horizontal axis and variance (cost function J) on the vertical axis showing a sweep of the effective volume parameter for the model from $Vol = 10^{-5}$ to $4 \times 10^{-3}$ for determining the effective volume $Vol_{eff}$ of the cooling fluid within the stack 12. The range of the sweep includes all realistic cooling fluid volumes. The effective volume $Vol_{eff}$ is at point 32, the minimum variance in the sweep. Also included in FIG. 3 is the actual cooling fluid volume in the stack 12 at point 34. Notice that the actual volume is considerably smaller than the effective volume $Vol_{eff}$. This is because the effective volume $Vol_{eff}$ accounts for the thermal mass of the stack 12. From FIG. 3 it is shown that the minimum cost function J that results in an accurate fit of the data results is an effective stack volume of $Vol_{eff} = 0.00089$.

Figure 4:
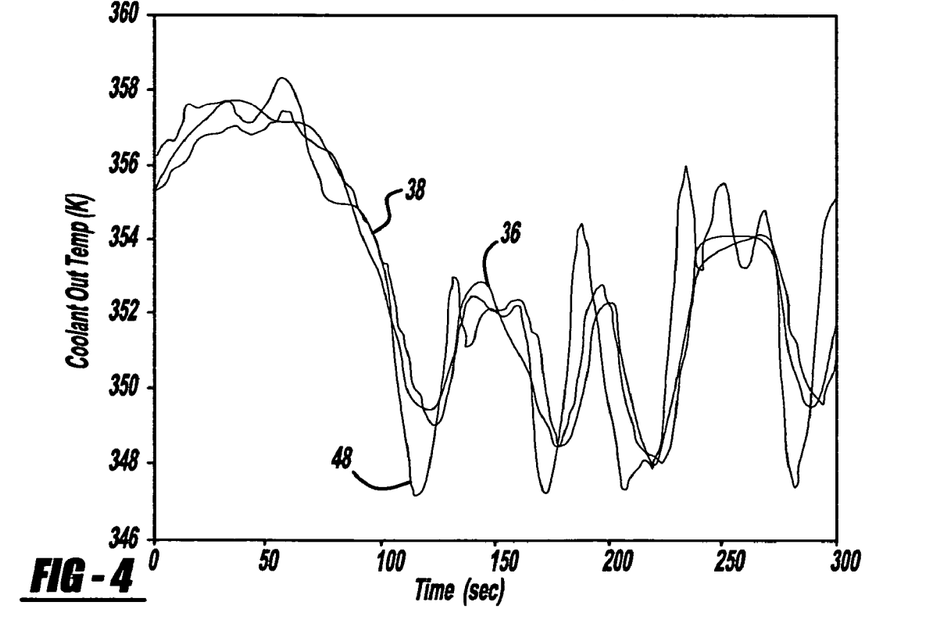
FIG. 4 is a graph with time on the horizontal axis and cooling fluid temperature out of the stack on the vertical axis showing a model based on effective volume.

FIG. 4 is a graph with time on the horizontal axis and the temperature $T_{stk,out}$ of the cooling fluid out of the stack 12 on the vertical axis. Graph line 36 is a plot of the temperature $T_{stk,out}$ of the cooling fluid out of the stack 12 determined from equation (3) using the effective volume $Vol_{eff}$, graph line 38 is a plot of the temperature $T_{stk,out}$ of the cooling fluid out of the stack 12 determined from equation (3) using the experimental data, and graph line 48 is a plot of the temperature $T_{stk,out}$ of the cooling fluid out of the stack 12 determined from equation (3) using the actual stack volume. From FIG. 4 it is shown that the thermal model based on the effective volume $Vol_{eff}$ is much closer to the actual temperature than the thermal model based on the actual volume by an order of magnitude. The model using the actual volume clearly has too fast of a response time.

Figure 5:
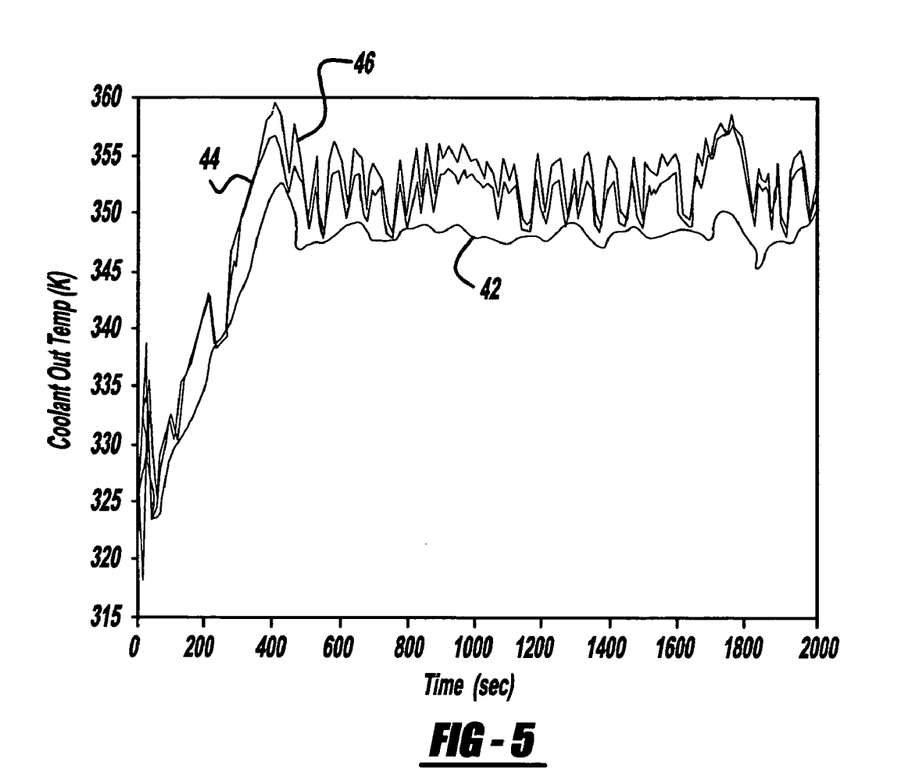
FIG. 5 is a graph with time on the horizontal axis and cooling fluid temperature out of the stack on the vertical axis showing a model fit for a complete experimental data set.

The thermal model can be validated by applying it to a much larger set of experimental data representing a more complex loading cycle. FIG. 5 is a graph with time on the horizontal axis and the temperature $T_{stk,out}$ of the cooling fluid out of the stack on the vertical axis. Graph line 42 is the measured temperature $T_{stk,in}$ of the cooling fluid into the stack 12, graph line 44 is the measured temperature $T_{stk,out}$ of the cooling fluid out of the stack 12, and graph line 46 is the temperature $T_{stk,out}$ of the cooling fluid out of the stack 12 determined by the thermal model using the effective volume $Vol_{eff}$. As shown, the thermal model captures the thermal dynamics of the fuel cell stack 12 with exceptional accuracy.

As discussed above, the cooling fluid mass flow rate $\dot{m}$ is directly related to the speed of the pump 20. For simplification, the mass flow rate $\dot{m}$ is considered a control input to the system 10, and therefore the thermal model. Likewise the temperature $T_{stk,out}$ of the cooling fluid out of the stack 12 is a state variable. The energy transferred to the cooling fluid from the stack power $\dot{E}_{gen}$ and the temperature $T_{stk,in}$ of the cooling fluid into the stack 12 are treated as disturbance that are known and easily measured. It is the disturbance $\dot{E}_{gen}$ that is rejected resulting in the improved control of the temperature $T_{stk,out}$ of the cooling fluid out of the stack 12.

The first step in applying the proposed temperature control scheme is to linearize the thermal model of equation (3), by using, for example, feedback linearization. To perform this linearization, equation (3) is rewritten below as equation (6).

$$\frac{d}{dt}T_{stk,out} = \underbrace{\frac{\dot{m}}{\rho Vol}(T_{stk,in} - T_{stk,out})}_{v} + \frac{\dot{E}_{gen}}{\rho Vol C_p} \quad (6)$$

Assigning the linearization variable v equal to the non-linear component of the thermal model gives the following linear model.

$$T_{stk,out} = \rho Vol v + \frac{\dot{E}_{gen}}{\rho Vol C_p} \quad (7)$$

$$T_{stk,out} = v + \frac{\dot{E}_{gen}}{\rho Vol C_p} \quad (8)$$

Where, $$v = \frac{\dot{m}}{\rho Vol}(T_{stk,in} - T_{stk,out}) \quad (9)$$

Essentially, v represents the control input to the linear model and the stack power $\dot{E}_{gen}$ is the disturbance. Because the thermal sub-system is expecting a mass flow rate command from the controller 28 to the pump 20, equation (9) is rewritten as follows when implemented in the controller 28.

$$\dot{m} = \frac{\rho Vol v}{(T_{stk,in} - T_{stk,out})} \quad (10)$$

It is necessary to note that equation (10) requires temperature measurement feedback for $T_{stk,in}$ and $T_{stk,out}$, hence the name of the non-linear control methodology. It is also important to note that due to the first-order nature of the thermal model of the fuel cell stack 12, the linearization process is simple, which is actually one of the features of the proposed control algorithm of the invention. As the order of the model increases, the complexity of the linearization process does as well.

Figure 6:
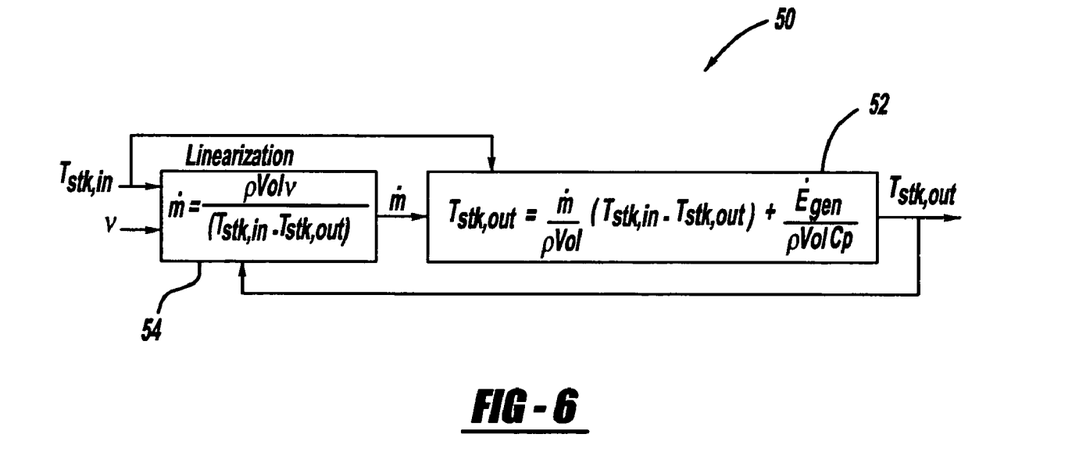
FIG. 6 is a block diagram illustrating feedback linearization for the control model of the invention.

FIG. 6 is a schematic block diagram of a system 50 showing the feedback linearization of the non-linear fuel cell thermal model based on the equations above. The system 50 includes a thermal model process block 52 that uses the non-linear equations (6) and (7) to provide the temperature $T_{stk,out}$ of the cooling fluid out of the stack 12. A linearization process block 54 calculates the mass flow rate $\dot{m}$ by equation (10), and provides the mass flow rate $\dot{m}$ to the process block 52 to linearize the thermal model. The temperature $T_{stk,out}$ of the cooling fluid out of the stack 12 and the temperature $T_{stk,in}$ of the cooling fluid into the stack 12 are provided as inputs to the process block 54 to provide the feedback linearization.

By providing the thermal model of the system 10 as determined above, numerous linear control techniques are available, including proportional-integral-differential (PID) control, robust control, optimal control and disturbance rejection control techniques, where disturbance rejection may be the most ideal. Disturbance rejection is chosen because of the desired system behavior. As discussed above, it is the stack power $\dot{E}_{gen}$ that is the disturbance. In most cases, the fuel cell thermal control is important because temperature is a primary component in control of the cathode relative humidity. Relative humidity is typically constant for optimum performance and durability. Thus, despite changes in the stack power $\dot{E}_{gen}$, it is desirable to keep the fuel cell temperature constant. Treating the stack power $\dot{E}_{gen}$ as a known disturbance and being able to reject this disturbance is a primary concern.

Disturbance rejection control is a feed-forward control technique used in conjunction with a standard feedback control, such as PID. When the control system is upset by a known disturbance, there is a controlled effort to minimize this effect on the desired system output. The advantage is that the output of the controller 28 is immediately affected by a detected change in the disturbance. This is contrary to known feedback control which waits until the desired output deviates from its set-point before adjusting the control action.

It should be noted that a few issues arise when applying disturbance rejection control. First, the disturbance to be rejected must be detected and measurable. It is this measured disturbance that is used in the actual control law. Also, the system's response to the control input, as well as the system's response to the disturbance must be known. Because the feed-forward component of the control algorithm is model based, a transfer function of the control scheme is required. Further, the addition of a feed-forward component does not aid in the stability of the system 10. The closed-loop poles remain unchanged. Lastly, disturbance rejection control does nothing to aid set-point tracking. This remains the duty of the feedback component.

Because feed-forward control is typically transfer function based, it is desirable to convert the linear fuel cell thermal model to a transfer function representation, such as a Laplace transform. Converting equation (7) into the Laplace transform (s) yields:

$$T_{stk,out}(s) = \frac{1}{\rho Vol C_p}\frac{1}{s}v(s) + \frac{1}{\rho Vol C_p}\frac{1}{s}\dot{E}_{gen}(s) \quad (11)$$

$$T_{stk,out}(s) = \frac{1}{s}v(s) + \frac{1}{\rho Vol C_p}\frac{1}{s}\dot{E}_{gen}(s) \quad (12)$$

$$= G_p v(s) + G_d \dot{E}_{gen}(s)$$

Figure 7:
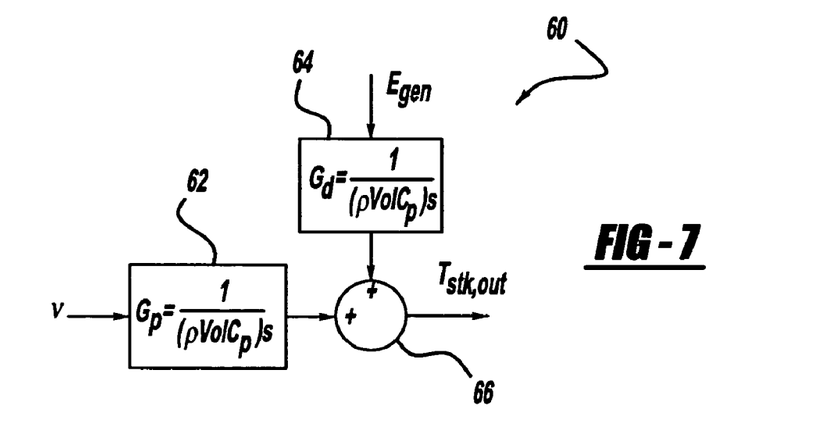
FIG. 7 is a block diagram showing a linear plant model for the thermal control model of the invention.

A plant block diagram is shown in FIG. 7 illustrating a linear plant model 60 for equation (11). The linear plant model 60 includes a process block 62 for calculating $G_p$ and a process block 64 for calculating $G_d$. The values $G_p$ and $G_d$ are added by a summer 66 to generate the temperature $T_{stk,out}$ of the cooling fluid out of the stack 12 from equation (11). With feed-forward control it is desired to alter the output of the feedback controller by some amount related to how the disturbance input affects the system.

Figure 8:
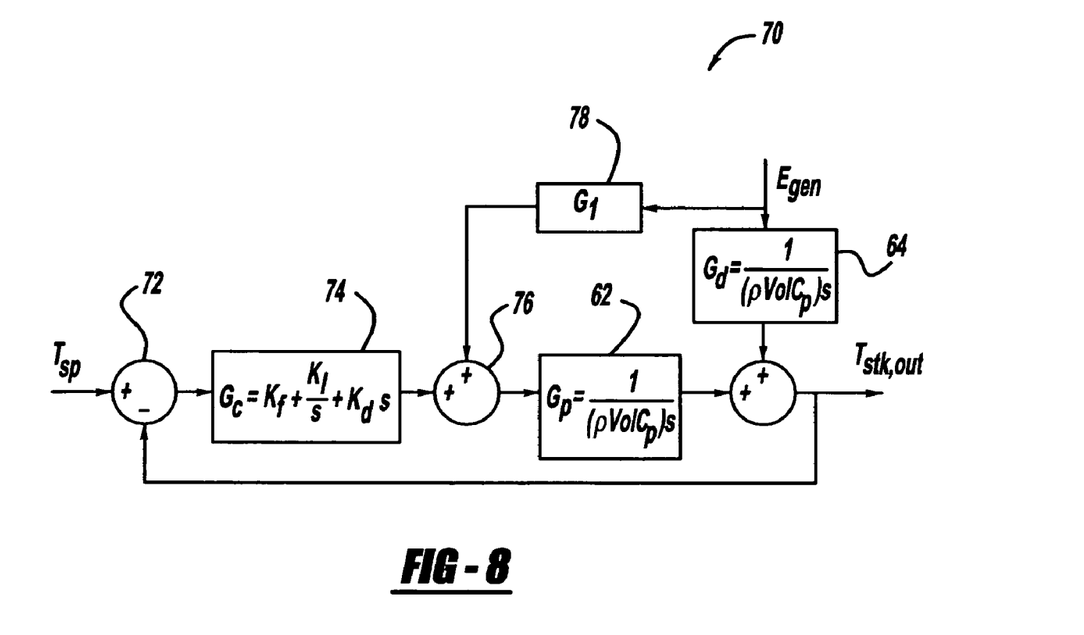
FIG. 8 is a block diagram illustrating a closed-loop control system including feed-forward disturbance rejection with feedback trim for the temperature control scheme of the invention.

FIG. 8 is a block diagram illustrating a closed-loop control system 70 showing feed-forward control with feedback trim.

The system 70 includes the linear plant model 60 discussed above for calculating the temperature $T_{stk,out}$ of the cooling fluid out of the stack 12. The measured temperature $T_{stk,out}$ signal is fed back to a summation block 72 that also receives a set-point signal $T_{sp}$ of the desired temperature of the cooling fluid out of the stack 12. An error signal between the desired temperature and the calculated temperature is sent to a controller 74 that uses a PID control signal $G_c$ for controlling the speed of the pump 20. The PID control signal $G_c$ is sent to a summation junction 76 to generate the pump signal v applied to the plant model 60. In order for the effect of the stack power disturbance $\dot{E}_{gen}$ to be removed from the PID control $G_c$, the stack power disturbance $\dot{E}_{gen}$ is first modified by a process block 78, as will be discussed in more detail below. The closed-loop transfer function of the system 70 is given as:

$$T_{stk,out}(s) = \frac{G_d + G_p G_1}{1 + G_p G_c}\dot{E}_{gen}(s) + \frac{G_p G_c}{1 + G_p G_c}T_{sp}(s) \quad (13)$$

From equation (13) it is clear that in order for the stack power disturbance $\dot{E}_{gen}(s)$ to be rejected:

$$G_1 = \frac{-G_d}{G_p} \quad (14)$$

This results in the common closed-loop transfer function for a system without disturbance given by:

$$\frac{T_{stk,out}}{T_{sp}}(s) = \frac{G_p G_c}{1 + G_p G_c} \quad (15)$$

As is apparent from equation (15), the stack power disturbance $\dot{E}_{gen}(s)$ to be rejected has been removed.

Due to the feedback linearization process presented above, the linear equation representing the dynamics of the fuel cell thermal sub-system results in a plain model with a disturbance rejection control of $$G_1 = -\frac{1}{\rho Vol C_p}.$$

However, it should be noted that only proportional control should be required to insure zero steady-state error.

By substituting equation (11) into equation (15) and applying the final value theorem gives:

$$T_{stk,out}(\infty) = \lim_{s \to 0}\left[s\left(\frac{\frac{1}{\rho Vol C_p}\frac{1}{s}G_c}{1 + \frac{1}{\rho Vol C_p}\frac{1}{s}G_c}\right)\left(\frac{T_{sp}}{s}\right)\right] \quad (16)$$

$$= \lim_{s \to 0}\left[\left(\frac{G_c}{\rho Vol C_p s + G_c}\right)(T_{sp})\right]$$

$$T_{stk,out}(\infty) = \lim_{s \to 0}\left[s\left(\frac{\frac{1}{s}G_c}{1 + \frac{1}{s}G_c}\right)\left(\frac{T_{sp}}{s}\right)\right] \quad (17)$$

This shows that as (s) approaches zero, $G_c$ only needs to be a proportional gain. This result implies that the proposed fuel cell thermal controller does not require integration as long as the system model is reasonably accurate. In practice, integrationless controllers are ideal because integrators can saturate, windup and need to be reset. It should be noted that if there is a large degree of model mismatch, this model-based control scheme might require additional feedback trim. This could come in the form of adding an integrator component to the PID controller.

For completeness, it is desirable to present the entire non-linear control law, as:

$$\dot{m} = \frac{K_p*(T_{sp} - T_{stk,out}) - \dot{E}_{gen}}{C_p*(T_{stk,in} - T_{stk,out})} \quad (18)$$

$$\dot{m} = \frac{\rho Vol K_p(T_{sp} - T_{stk,out}) - \frac{1}{C_p}\dot{E}_{gen}}{(T_{stk,in} - T_{stk,out})} \quad (19)$$

Where, $K_p$ is the proportional gain from the feedback controller $G_c$.

Figure 9:
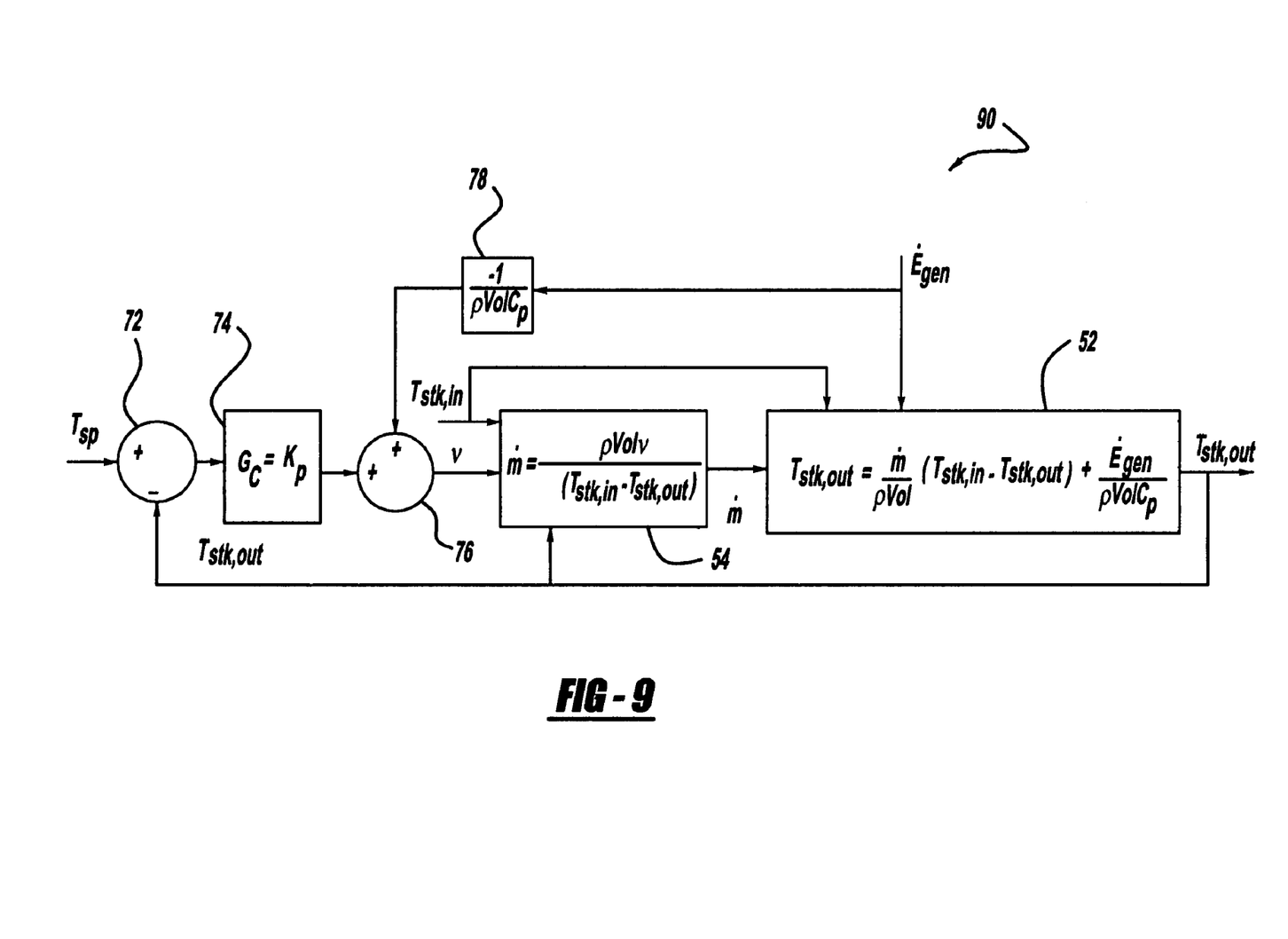
FIG. 9 is a block diagram of a control scheme for controlling fuel stack temperature, according to an embodiment of the present invention.

FIG. 9 is a block diagram of a modified control system 90 of the invention using the non-linear control law of equation (18), where like elements are identified by the same reference numeral. In the PID controller 74, $G_c$ is equal, but not limited to, the proportional control term $K_p$ as determined by equation (16). Further, the transfer function or process block 78 is set at $$-\frac{1}{\rho Vol C_p}$$

times the measured stack power $\dot{E}_{gen}$. The mass flow rate $\dot{m}$ calculated by the linearization process block 54 is then applied to the thermal model process block 52 that generates the temperature $T_{stk,out}$ of the cooling fluid out of the stack 12. Therefore, it is the mass flow rate $\dot{m}$ for the speed of the pump 20, as represented by equation (18) that sets the cooling of the stack 12 to provide the desired temperature.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the temperature of a fuel cell stack in a fuel cell system, said method comprising:
developing a thermal model of the fuel cell stack that employs non-linear equations;
generating an error signal that is the difference between a desired stack temperature and a temperature of a cooling fluid out of the fuel cell stack;
applying feedback control to the error signal to generate a control signal;
modifying a disturbance signal to generate a modified disturbance signal;
adding the control signal to the modified disturbance signal to generate a linearization variable;
generating a mass flow rate signal using the linearization variable; and
linearizing the thermal model using the mass flow rate signal to reject the disturbance in the modified disturbance signal, wherein linearizing the thermal model includes using the mass flow rate signal, the disturbance and a temperature of the cooling fluid into the stack; said fuel cell system including a controller that controls the temperature of the fuel cell stack using the linear thermal model.

2. The method according to claim 1 wherein the disturbance is a measured stack power and wherein modifying a disturbance signal to generate a modified disturbance signal includes multiplying the stack power by $$-\frac{1}{\rho Vol C_p}.$$

3. The method according to claim 1 wherein applying feedback control to the error signal includes using a proportional-integral-derivative controller.

4. The method according to claim 1 wherein generating a mass flow rate signal using the linearization variable includes generating a mass flow rate signal using the linearization variable, a temperature of the cooling fluid into the stack and the temperature of the cooling fluid out of the stack.

5. The method according to claim 4 wherein generating a mass flow rate signal includes determining the mass flow rate signal by the equation:

$$\dot{m} = \frac{\rho Vol v}{(T_{stk,in} - T_{stk,out})}$$

where $\dot{m}$ is the mass flow rate signal, v is the linearization variable, $T_{stk,in}$ is the temperature of the cooling fluid into the stack, $T_{stk,out}$ is the temperature of the cooling fluid out of the stack and $C_p$ is the specific heat of the stack.

6. The method according to claim 1 wherein developing a thermal model of the fuel cell stack that employs non-linear equations includes developing a lumped parameter non-linear model.

7. The method according to claim 1 wherein linearizing the thermal model includes using the equation:

$$T_{stk,out} = \frac{\dot{m}}{\rho Vol}(T_{stk,in} - T_{stk,out}) + \frac{\dot{E}_{gen}}{\rho Vol C_p}$$

where $\dot{m}$ is the mass flow, Vol is an effective volume of the stack, $\rho$ is the stack pressure, $T_{stk,in}$ is the temperature of the cooling fluid into the stack, $T_{stk,out}$ is the temperature of the cooling fluid out of the stack, $C_p$ is the specific heat of the stack and $\dot{E}_{gen}$ is the stack power.

8. The method according to claim 1 further comprising using the mass flow rate signal to control the speed of a pump that pumps the cooling fluid through the fuel cell stack.

9. The method according to claim 1 wherein the fuel cell system is part of a fuel cell engine on a vehicle.

10. A fuel cell system comprising:
a fuel cell stack;
a pump for pumping a cooling fluid through the stack; and
a controller for controlling the speed of the pump so as to maintain the temperature of the stack at a desired temperature, said controller generating an error signal that is the difference between a desired stack temperature and a temperature of the cooling fluid out of the fuel cell stack, applying feedback control to the error signal to generate a control signal, modifying a disturbance signal to generate a modified disturbance signal, adding the control signal to the modified disturbance signal to generate a linearization variable, generating a mass flow rate signal using the linearization variable, and linearizing a thermal model using the mass flow rate signal to reject the disturbance in the modified disturbance signal, wherein the controller uses the mass flow rate signal to control the speed of the pump, wherein the controller linearizes the thermal model using the mass flow rate signal, the disturbance and a temperature of the cooling fluid into the stack.

11. The system according to claim 10 wherein the disturbance is a measured stack power and wherein the controller modifies the disturbance signal to generate the modified disturbance signal by multiplying the stack power by $$-\frac{1}{\rho Vol C_p}.$$

12. The system according to claim 10 wherein the controller includes a proportional-integral-derivative controller to generate the control signal.

13. The system according to claim 10 wherein the controller generates the mass flow rate signal using the linearization variable, the temperature of the cooling fluid into the stack and the temperature of the cooling fluid out of the stack.

14. The system according to claim 13 wherein the controller generates the mass flow rate signal by the equation:

$$\dot{m} = \frac{\rho Vol v}{(T_{stk,in} - T_{stk,out})}$$

where $\dot{m}$ is the mass flow rate signal, v is the linearization variable, $T_{stk,in}$ is the temperature of the cooling fluid into the stack, $T_{stk,out}$ is the temperature of the cooling fluid out of the stack and $C_p$ is the specific heat of the stack.

15. The system according to claim 10 wherein the controller linearizes the thermal model using the equation:

$$T_{stk,out} = \frac{\dot{m}}{\rho Vol}(T_{stk,in} - T_{stk,out}) + \frac{\dot{E}_{gen}}{\rho Vol C_p}$$

where $\dot{m}$ is the mass flow, Vol is an effective volume of the stack, $\rho$ is the stack pressure, $T_{stk,in}$ is the temperature of the cooling fluid into the stack, $T_{stk,out}$ is the temperature of the cooling fluid out of the stack, $C_p$ is the specific heat of the stack and $\dot{E}_{gen}$ is the stack power.

16. The system according to claim 10 wherein the fuel cell system is pad of a fuel cell engine on a vehicle.

17. A method for controlling the temperature of a fuel cell stack in a fuel cell system, said method comprising:
developing a thermal model of the fuel cell stack that employs non-linear equations;
generating an error signal that is the difference between a desired stack temperature and a temperature of a cooling fluid out of the fuel cell stack;
applying feedback control to the error signal to generate a control signal;

$$-\frac{1}{\rho Vol C_p}$$

ing a disturbance signal to generate a modified disturbance signal, wherein the disturbance is a measured stack power and wherein modifying a disturbance signal to generate a modified disturbance signal includes multiplying the stack power by;
adding the control signal to the modified disturbance signal to generate a linearization variable;
generating a mass flow rate signal using the linearization variable; and
linearizing the thermal model using the mass flow rate signal to reject the disturbance in the modified disturbance signal; said fuel cell system including a controller that controls the temperature of the fuel cell stack using the linear thermal model.

18. A method for controlling the temperature of a fuel cell stack in a fuel cell system, said method comprising:
developing a thermal model of the fuel cell stack that employs non-linear equations;
generating an error signal that is the difference between a desired stack temperature and a temperature of a cooling fluid out of the fuel cell stack;
applying feedback control to the error signal to generate a control signal;
modifying a disturbance signal to generate a modified disturbance signal;
adding the control signal to the modified disturbance signal to generate a linearization variable;
generating a mass flow rate signal using the linearization variable, wherein generating a mass flow rate signal using the linearization variable includes generating a mass flow rate signal using the linearization variable, a temperature of the cooling fluid into the stack and the temperature of the cooling fluid out of the stack; and
linearizing the thermal model using the mass flow rate signal to reject the disturbance in the modified disturbance signal; said fuel cell system including a controller that controls the temperature of the fuel cell stack using the linear thermal model.

19. A fuel cell system comprising:
a fuel cell stack;
a pump for pumping a cooling fluid through the stack; and
a controller for controlling the speed of the pump so as to maintain the temperature of the stack at a desired temperature, said controller generating an error signal that is the difference between a desired stack temperature and a temperature of the cooling fluid out of the fuel cell stack, applying feedback control to the error signal to generate a control signal, modifying a disturbance signal to generate a modified disturbance signal, adding the control signal to the modified disturbance signal to generate a linearization variable, generating a mass flow rate signal using the linearization variable, and linearizing a thermal model using the mass flow rate signal to reject the disturbance in the modified disturbance signal, wherein the disturbance is a measured stack power and wherein the controller modifies the disturbance signal to generate the modified disturbance signal by multiplying the stack power by $$-\frac{1}{\rho Vol C_p},$$

wherein the controller uses the mass flow rate signal to control the speed of the pump.

20. A fuel cell system comprising:
a fuel cell stack;
a pump for pumping a cooling fluid through the stack; and
a controller for controlling the speed of the pump so as to maintain the temperature of the stack at a desired temperature, said controller generating an error signal that is the difference between a desired stack temperature and a temperature of the cooling fluid out of the fuel cell stack, applying feedback control to the error signal to generate a control signal, modifying a disturbance signal to generate a modified disturbance signal, adding the control signal to the modified disturbance signal to generate a linearization variable, generating a mass flow rate signal using the linearization variable, and linearizing a thermal model using the mass flow rate signal to reject the disturbance in the modified disturbance signal, wherein the controller generates the mass flow rate signal using the linearization variable, the temperature of the cooling fluid into the stack and the temperature of the cooling fluid out of the stack, and wherein the controller uses the mass flow rate signal to control the speed of the pump.

* * * * *